(12) United States Patent
Kim

(10) Patent No.: US 12,209,627 B2
(45) Date of Patent: Jan. 28, 2025

(54) ELECTRIC PARKING BRAKE

(71) Applicant: HL MANDO CORPORATION, Pyeongtaek (KR)

(72) Inventor: Chanwool Kim, Seongnam (KR)

(73) Assignee: HL MANDO CORPORATION, Pyeongtaek (KR)

( * ) Notice: Subject to any disclaimer, the term of this patent is extended or adjusted under 35 U.S.C. 154(b) by 360 days.

(21) Appl. No.: 17/747,942

(22) Filed: May 18, 2022

(65) Prior Publication Data

US 2022/0373047 A1    Nov. 24, 2022

(30) Foreign Application Priority Data

May 21, 2021  (KR) .......................... 10-2021-0065690

(51) Int. Cl.
| | |
|---|---|
| *F16D 65/18* | (2006.01) |
| *F16D 121/04* | (2012.01) |
| *F16D 121/20* | (2012.01) |
| *F16D 125/04* | (2012.01) |
| *F16D 125/06* | (2012.01) |
| *F16D 125/08* | (2012.01) |

(52) U.S. Cl.
CPC .......... *F16D 65/18* (2013.01); *F16D 2121/04* (2013.01); *F16D 2121/20* (2013.01); *F16D 2125/04* (2013.01); *F16D 2125/06* (2013.01); *F16D 2125/08* (2013.01)

(58) Field of Classification Search
CPC .. F16D 65/18; F16D 2121/04; F16D 2121/20; F16D 2125/04; F16D 2125/06; F16D 2125/08; B60T 13/58
USPC ................................................. 188/156–164
See application file for complete search history.

(56) References Cited

U.S. PATENT DOCUMENTS

| | | | | |
|---|---|---|---|---|
| 2006/0163939 | A1* | 7/2006 | Kuramochi | ............. B60T 8/885 |
| | | | | 303/122.04 |
| 2013/0299288 | A1* | 11/2013 | Ryu | ...................... F16D 55/226 |
| | | | | 188/72.4 |
| 2014/0284151 | A1* | 9/2014 | Yokoyama | ............ B60T 13/588 |
| | | | | 188/72.3 |
| 2016/0355169 | A1* | 12/2016 | Ohlig | .................... B60T 13/741 |
| 2017/0276199 | A1* | 9/2017 | Yabusaki | .............. F16D 66/026 |

(Continued)

FOREIGN PATENT DOCUMENTS

| | | |
|---|---|---|
| DE | 19620344 A1 | 8/1997 |
| DE | 19511811 B4 | 10/2005 |
| DE | 102006001543 A1 | 10/2006 |

(Continued)

OTHER PUBLICATIONS

DE OA dated Jan. 23, 2023.

*Primary Examiner* — Christopher P Schwartz
(74) *Attorney, Agent, or Firm* — Harvest IP Law, LLP

(57) ABSTRACT

Disclosed herein an electric parking brake (EPB) that is controlled by an electrical signal and generates a parking braking force includes a caliper housing including a cylinder and a piston slidably provided in the cylinder; and an actuator installed in the cylinder to press and release the piston; wherein the actuator comprises a linear motor installed in the cylinder and having a moving member that moves linearly according to an electrical signal, and a pressing portion that is press-fitted to the moving member to move together with the moving member and presses selectively the piston.

10 Claims, 4 Drawing Sheets

(56) References Cited

U.S. PATENT DOCUMENTS

2019/0256072 A1\* 8/2019 Hyeon .................... F16D 65/18
2020/0408265 A1\* 12/2020 Al-Mahshi ............ F16D 65/183

FOREIGN PATENT DOCUMENTS

| DE | 102010040426 A1 | | 4/2011 | |
|---|---|---|---|---|
| DE | 102019202219 A1 | \* | 8/2019 | ............. B60T 1/065 |
| JP | 2019130938 A | \* | 8/2019 | ............. B60T 17/22 |
| KR | 20110072877 A | | 6/2011 | |

\* cited by examiner

[FIG. 1]
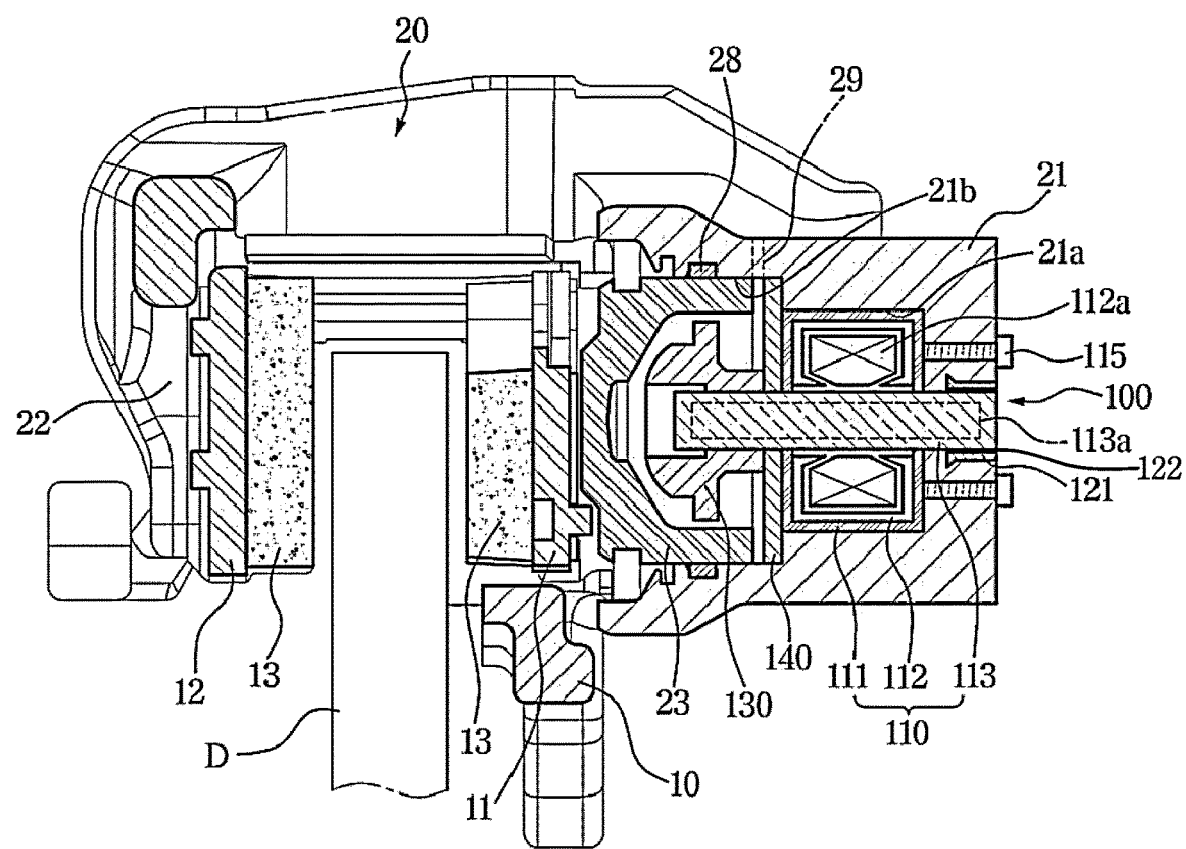

[FIG. 2]
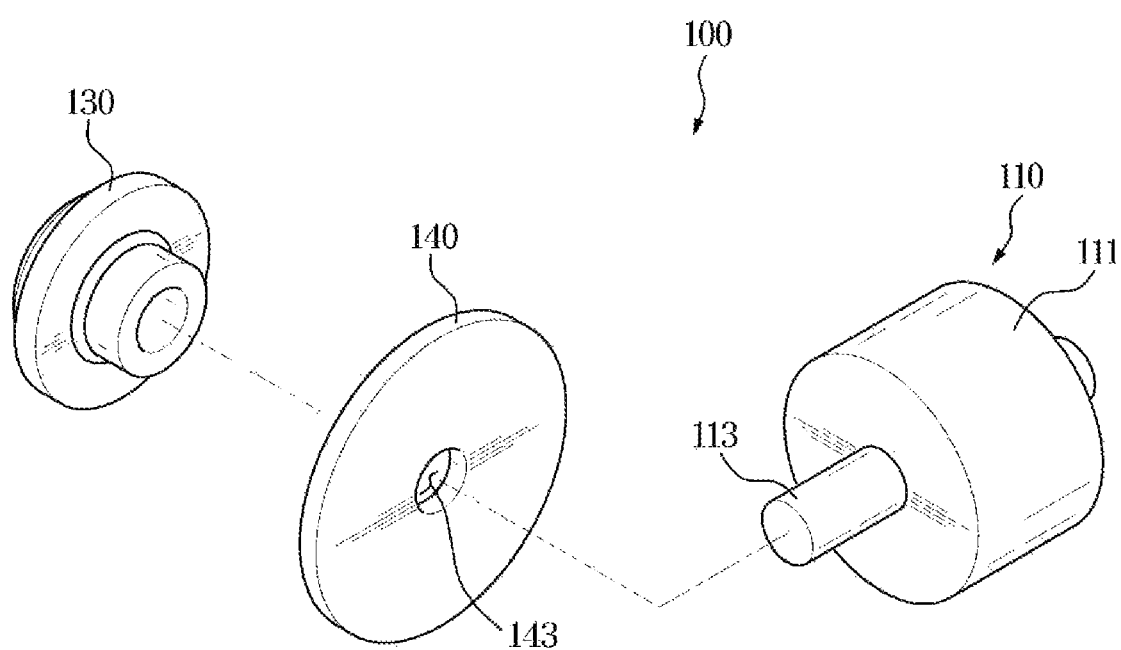

[FIG. 3]
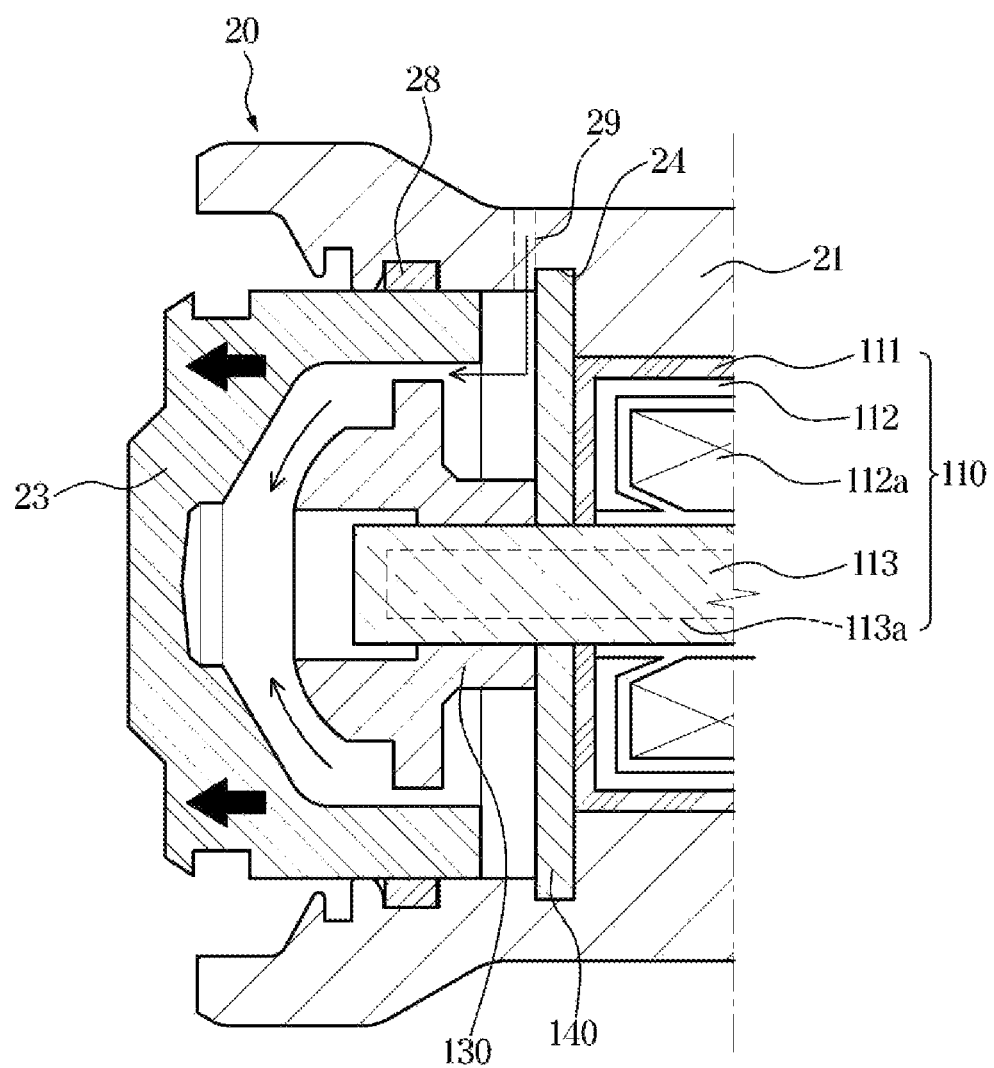

[FIG. 4]
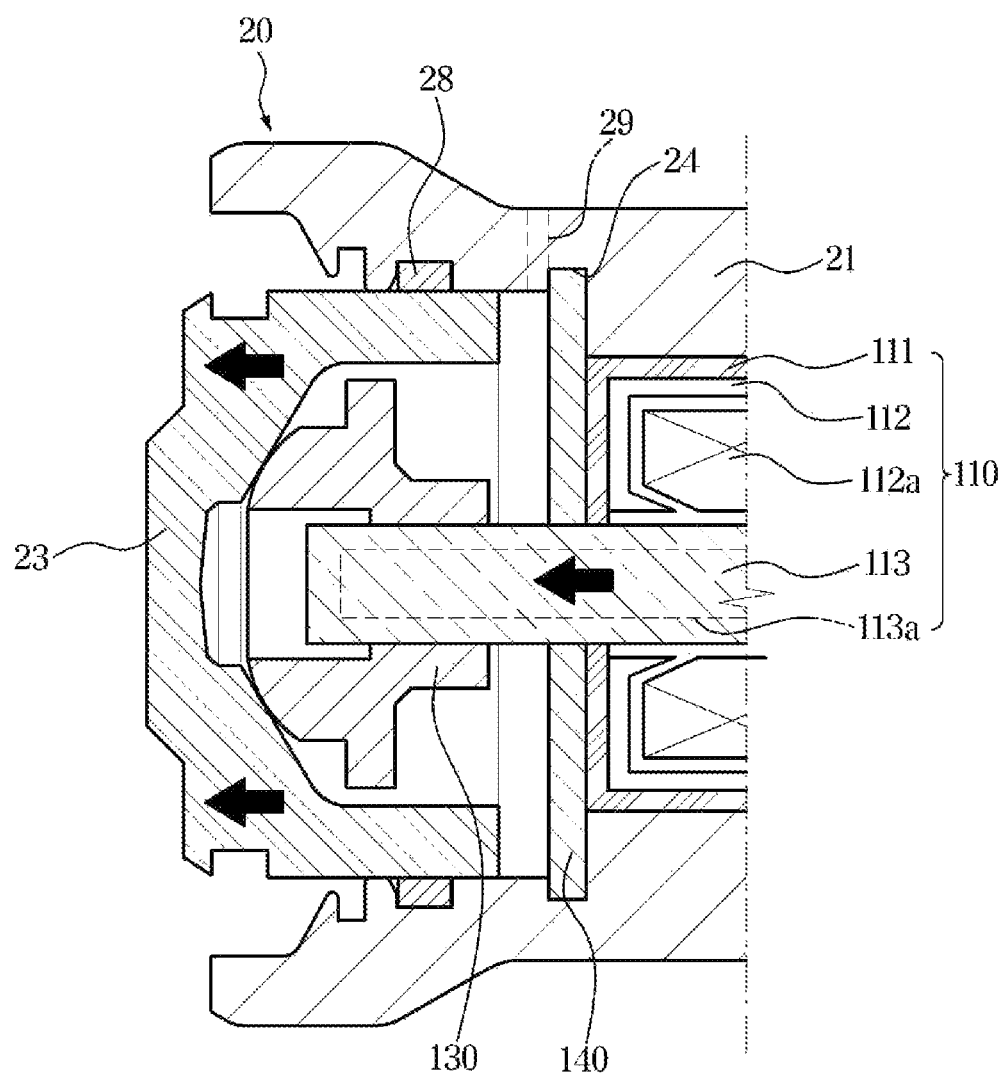

ELECTRIC PARKING BRAKE

CROSS-REFERENCE TO RELATED APPLICATION(S)

This application is based on and claims priority under 35 U.S.C. § 119 to Korean Patent Application No. 10-2021-0065690, filed on May 21, 2021 in the Korean Intellectual Property Office, the disclosure of which is incorporated herein by reference in its entirety.

TECHNICAL FIELD

The disclosure relates to an electric parking brake, and more particularly, to an electric parking brake capable of realizing a parking function by operation of a motor.

BACKGROUND

In general, a brake device is a device that stops a vehicle from moving during braking or parking, and serves to hold wheels of the vehicle from rotating.

Recently, an Electric Parking Brake (EPB) system for electrically controlling operation of a parking brake has been widely used. The EPB is mounted on a conventional caliper brake to perform a function of the parking brake. Electric caliper brakes may include a cable puller type, a motor-on-caliper (MOC) type, and a hydraulic parking brake type.

For example, Korean Patent Publication No. 10-2011-0072877 (Jun. 29, 2011) relates to a MOC-type EPB. The document discloses a structure that a motor generating power is connected to an actuator, and the power generated from the motor is decelerated using a plurality of gears and presses a piston through a ball screw nut device that converts a rotational force into a linear motion, thereby performing a braking operation. As such, actuators used in the EPB generate large vibrations and noises, and inferior in terms of assembly and price competitiveness.

Furthermore, Actuators used in the EPB take a disadvantage in that cost increases as well as volume and weight increase as the number of parts increases.

SUMMARY

One aspect of the disclosure is to provide an electric parking brake capable of increasing energy efficiency and improving assembly by simplifying a power transmission structure through a linear motor performing a linear motion.

Another aspect of the disclosure is to provide an electric parking brake capable of lowering cost, weight and volume by reducing the number of parts, and facilitating packaging of the electric parking brake.

Additional aspects of the disclosure will be set forth in part in the description which follows and, in part, will be obvious from the description, or may be learned by practice of the disclosure.

In accordance with an aspect of the disclosure, an electric parking brake that is controlled by an electrical signal and generates a parking braking force includes a caliper housing including a cylinder and a piston slidably provided in the cylinder; and an actuator installed in the cylinder to press and release the piston; wherein the actuator comprises a linear motor installed in the cylinder and having a moving member that moves linearly according to an electrical signal, and a pressing portion that is press-fitted to the moving member to move together with the moving member and presses selectively the piston.

The linear motor may include a motor housing installed in the cylinder; a stator disposed in the motor housing and including a coil generating magnetic energy by an applied power; and the moving member having a magnet to reciprocate with respect to the stator.

The moving member may have a bar shape with a predetermined length, wherein opposite ends in a longitudinal direction thereof pass through the motor housing, one end thereof is coupled to the pressing portion, and the other end thereof is provided to pass through a rear wall of the cylinder.

A guide sleeve configured to support the moving member may be provided on the rear wall of the cylinder through which the moving member passes.

A sealing member may be provided between the moving member and the guide sleeve.

The electric parking brake may further include a fixing bolt passing through a rear side of the cylinder to fix the motor housing.

A sealing member may be provided in a bore in the cylinder to block an inflow of brake oil into the linear motor.

The sealing member may be provided to have a disk shape in which a through hole is formed so that the moving member 113 passes through a center thereof.

A fixing groove recessed inwardly may be formed in a bore in the cylinder and an outer side of the sealing member may be fixed to the fixing groove.

The cylinder may include a first bore in which the linear motor is installed, and a second bore in which the piston is disposed, and the first and second bores may be formed to be stepped.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a side cross-sectional view illustrating an electric parking brake according to an embodiment of the disclosure;

FIG. 2 is a view illustrating a state in which a moving member and a pressurizer of a linear motor provided in an electric parking brake are coupled to each other according to an embodiment of the disclosure;

FIG. 3 is a view illustrating an operating state of the electric parking brake according to an embodiment of the disclosure; and FIG. 4 is a view illustrating an operating state of the electric parking brake according to an embodiment of the disclosure.

DETAILED DESCRIPTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

FIG. 1 is a side cross-sectional view illustrating an electric parking brake according to an embodiment of the disclosure, and FIG. 2 is a view illustrating a state in which a moving member and a pressurizer of a linear motor provided in an electric parking brake are coupled to each other according to an embodiment of the disclosure.

Referring to FIGS. 1 and 2, an electric parking brake (EPB) 1 according to an embodiment of the disclosure may include a carrier 10 on which a pair of pad plates 11 and 12 are installed so as to press a disk D rotating together with wheels of a vehicle, a caliper housing 20 slidably installed on the carrier 10 to operate the pair of pad plates 11 and 12, an actuator 100 that generates and provide a driving force for moving the pair of pad plates 11 and 12, and an electronic control unit (ECU, not shown) for controlling operation of the actuator 100.

The pair of pad plates 11 and 12 includes an inner pad plate 11 disposed in contact with a piston 23 and an outer pad plate 12 disposed in contact with a finger part 22 of the caliper housing 20 to be described later. The pair of pad plates 11 and 12 are installed on the carrier 10 fixed to a vehicle body so as to move forward and backward toward opposite sides of the disk D and perform a braking operation. Furthermore, a friction pad 13 is attached to one surface of each of the pair of pad plates 11 and 12 facing the disk D.

The caliper housing 20 is slidably installed on the carrier 10 through a guide rod (not shown). The caliper housing 20 has a cylinder 21 in which the piston 23 and the actuator 100 are installed in a rear side thereof (a right side based on FIG. 1), and a finger part 110 bent downward on a front side thereof (a left side based on FIG. 3) to operate the outer pad plate 12. The finger part 22 and the cylinder 21 are integrally formed.

The piston 23 is provided in a cylindrical shape with a cup-shaped interior and is slidably inserted in the cylinder 21. The piston 23 presses the inner pad plate 11 toward the disk D by axial force of the pressing portion 130 according to the operation of hydraulic pressure (a brake oil) or the actuator 100. Accordingly, when a pressing force by hydraulic pressure for braking or the pressing portion 130 is applied to the inside of the cylinder 21, the piston 23 moves forward toward the inner pad plate 11 to press the inner pad plate 11, and in turn by the reaction force, the caliper housing 20 operates in an opposite direction to the piston 23 so that the finger part 22 presses the outer pad plate 12 toward the disk D, thereby performing braking.

Furthermore, an oil port 29 through which the brake oil is introduced is formed in the caliper housing 20 so that hydraulic pressure for braking may be applied to the inside of the cylinder 21, and a sealing member 28 is provided between an outer surface of the piston 23 and an inner surface of the cylinder 21 to prevent oil from leaking. The sealing member 28 serves to prevent leakage of brake oil flowing into the cylinder 21 and to return the piston 23 to its original position when braking is released.

Meanwhile, the cylinder 21 may be provided to have a first bore 21a in which the actuator 100 is installed and a second bore 21b in which the piston 23 is arranged. In other words, the first and second bores 21a and 21b in the cylinder 21 may have a stepped. The first bore 21a has a diameter smaller than that of the second bore 21b, but is not limited thereto, and the first bore 21a may have a diameter larger than that of the second bore 21b.

The actuator 100 is installed in the cylinder 21 and serves to press or release the piston 23. More specifically, the actuator 100 may include a linear motor 110 and the pressing portion 130. The linear motor 110 includes a moving member 113 that is installed in the cylinder 21 and moves linearly according to an electrical signal, and the pressing portion 130 is press-fitted with the moving member 113 to move together with the moving member 113 and selectively press the piston 23.

The linear motor 110 may include a motor housing 111 installed in the first bore 21a of the cylinder 21, a stator 112 including a coil 112a disposed in the motor housing 111 to generate magnetic energy by the applied power thereto, and the moving member 113 having a magnet 113a and reciprocating with respect to the stator 112.

The moving member 113 has a bar shape with a predetermined length, and opposite ends in a longitudinal direction thereof are provided to pass through the motor housing 111. The moving member 113 may be provided such that one end thereof is coupled to the pressing portion 130 to be described later and the other end thereof passes through a rear wall of the cylinder 21. The moving member 113 interacts with magnetic force generated by alternating current applied to the coil 112a of the stator 112 to reciprocate. Accordingly, the moving member 113 may have a single pole or a plurality of pole structures on which the magnet 113a is magnetized, or the magnet 113a may be installed on the moving member 113.

The configuration of reciprocating the moving member 113 by applying a current to the linear motor 110 as described above is a well-known, so a detailed description thereof will be omitted.

On the other hand, the pressing portion 130 is press-fitted to one end of the moving member 113 penetrating a front side of the motor housing 111 (left side based on the figure shown in FIG. 1. Because the pressing portion 130 is press-fitted to the moving member 113, the pressing portion 130 moves together when the moving member 113 moves in a straight line. The pressing portion 130 is disposed in the piston 23 slidably installed in the second bore 21b of the cylinder 21 to move together with the movement of the moving member 113 and selectively presses the piston 23. In other words, when the moving member 113 is operated, the pressing portion 130 presses the piston 23 against the inner pad plate 11, thereby generating a parking braking force.

The other end of the moving member 113 penetrating a rear side of the motor housing 111 (right side based on the figure shown in FIG. 1) is provided to pass through the cylinder 21. Accordingly, a guide sleeve 121 for supporting the moving member 113 may be provided on the rear wall of the cylinder 21 through which the moving member 113 passes. As shown in FIG. 1, a sealing member 122 may be provided between the moving member 113 and the guide sleeve 121 to prevent an inflow of foreign substances into the cylinder 21. Accordingly, the moving member 113 may be stably moved while being supported by the guide sleeve 121 during reciprocating motion thereof.

Meanwhile, although not shown, a separate cover may be coupled to the rear side of the cylinder 21 to prevent the other end of the moving member 113 from being exposed to the outside.

The linear motor 110 may further include a fixing bolt 115 penetrating the rear side of the cylinder 21 to fix the motor housing 111. The fixing bolt 115 serves to firmly fix the motor housing 111 in the cylinder 21, and also serves to prevent deformation of the motor housing 111 and the cylinder 21 by the axial force generated when the parking braking force is implemented through the moving member 113.

According to an embodiment of the disclosure, the EPB 1 may further include a sealing member 140 installed in the bore in the cylinder 21 to block the inflow of brake oil into the linear motor 110.

The sealing member 140 may be provided to have a disk shape in which a through hole 143 is formed so that the moving member 113 passes through a center thereof. The sealing member 140 may be disposed on a front side of the linear motor 110. As shown in drawings, a fixing groove 24 recessed inwardly is formed in the second bore 21b so that the sealing member 140 is fixed in the cylinder 21, and thus the sealing member 140 is fixed to the fixing groove 24 on an outer side thereof.

The sealing member 140 may not only prevent the introduction of brake oil into the linear motor 110, but also serve to damper an impact by supporting the axial force generated when the parking braking force is implemented. Furthermore, the sealing member 140 may prevent damage to the linear motor 110 by preventing the pressing portion 130 press-fitted to the moving member 113 from being in contact with linear motor 110 while retreating when the moving member 113 reciprocates.

Hereinafter, an operation state of the EPB as described above will be described with reference to FIGS. 3 and 4.

FIG. 3 is a view illustrating a state in which the piston moves by braking hydraulic pressure to generate a braking force, and FIG. 4 is a view illustrating a state in which a parking braking force is generated through the linear motor.

Referring to FIG. 3, when a driver depresses a brake pedal for braking, brake oil is supplied into the cylinder 21 through the oil port 29 so that the piston 23 moves forward toward the inner pad plate 11 to press the inner pad plate 11, and in turn by the reaction force, the caliper housing 20 is operated in the opposite direction to the piston 23 so that the finger part 22 presses the outer pad plate 12 toward the disk D, thereby performing the braking operation.

Referring to FIG. 4, when a driver manipulates a switch (not shown) provided in a driver seat of the vehicle, the moving member 113 of the linear motor 110 receiving power according to a driver's intention to brake advances to the front side thereof, and thus the pressing portion 130 press-fitted with the moving member 113 move together to press the piston 23. As a result, the piston 23 presses the inner pad plate 11 to generate the parking braking force. Meanwhile, since the moving member 113 interacts with the magnetic force generated by the alternating current applied to the coil 112a of the linear motor 110 to perform a reciprocating motion, for example, when power is applied to the opposite side that generates the parking braking force during releasing of braking, the moving member 113 returns to its original position.

As is apparent from the above, an embodiment of the disclosure may provide the EPB capable of simplifying a power transmission structure through a conventional multiple gear connection structure, as well as increasing energy efficiency by transmitting power through a linear motor performing a linear motion.

Further, an embodiment of the disclosure may provide the EPB capable of improving assembly by simplifying a structure thereof, and facilitating packaging of the EPB.

Further, an embodiment of the disclosure may provide the EPB capable of lowering cost, weight and volume by reducing the number of parts, and improving usability of installation space.

As described above, the exemplary embodiments of the disclosure have thus far been described with reference to accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. An electric parking brake (EPB) that is controlled by an electrical signal and generates a parking braking force, comprising:
  a caliper housing including a cylinder and a piston slidably provided in the cylinder; and
  an actuator installed in the cylinder to press and release the piston;
  wherein the actuator comprises:
  a linear motor installed in the cylinder and having a moving member that reciprocates in a straight line according to an electrical signal, and
  a pressing portion that is press-fitted to the moving member to move together with the moving member and presses selectively the piston,
  wherein the moving member includes a magnet therein to reciprocate with respect to a stator.

2. The electric parking brake of claim 1, wherein the linear motor comprises:
  a motor housing installed in the cylinder;
  the stator disposed in the motor housing and including a coil generating magnetic energy by an applied power.

3. The electric parking brake of claim 2, wherein the moving member has a bar shape with a predetermined length, wherein opposite ends in a longitudinal direction thereof pass through the motor housing, one end thereof is coupled to the pressing portion, and the other end thereof is provided to pass through a rear wall of the cylinder.

4. The electric parking brake of claim 3, wherein a guide sleeve configured to support the moving member is provided on the rear wall of the cylinder through which the moving member passes.

5. The electric parking brake of claim 4, wherein a sealing member is provided between the moving member and the guide sleeve.

6. The electric parking brake of claim 2, further comprising a fixing bolt passing through a rear side of the cylinder to fix the motor housing.

7. The electric parking brake of claim 1, wherein a sealing member is provided in a bore in the cylinder to block an inflow of brake oil into the linear motor.

8. The electric parking brake of claim 7, wherein the sealing member is provided to have a disk shape in which a through hole is formed so that the moving member passes through a center thereof.

9. The electric parking brake of claim 8, wherein
  a fixing groove recessed inwardly is formed in a bore in the cylinder, and
  an outer side of the sealing member is fixed to the fixing groove.

10. The electric parking brake of claim 1, wherein
  the cylinder includes a first bore in which the linear motor is installed, and a second bore in which the piston is disposed, and
  the first and second bores are formed to be stepped.

* * * * *